Mar. 20, 1923.

H. M. PATCH

RESILIENT WHEEL

Filed July 5, 1922

1,449,188

INVENTOR:
Harry M. Patch
BY
Pierre Barnes
ATTORNEY

Patented Mar. 20, 1923.

1,449,188

UNITED STATES PATENT OFFICE.

HARRY M. PATCH, OF SEATTLE, WASHINGTON, ASSIGNOR, BY MESNE ASSIGNMENTS, TO ELLIS RESILIENT-WHEEL CORPORATION, OF SEATTLE, WASHINGTON.

RESILIENT WHEEL.

Application filed July 5, 1922. Serial No. 572,866.

*To all whom it may concern:*

Be it known that I, HARRY M. PATCH, a citizen of the United States, residing at Seattle, in the county of King and State of Washington, have invented certain new and useful Improvements in Resilient Wheels, of which the following is a specification.

This invention relates to resilient vehicle-wheels, and its object generally stated is the perfecting of wheels of this character.

More specific objects and advantages of the invention will appear in the following description.

The invention consists in the novel construction, adaptation and combination of parts hereinafter described and claimed.

In the accompanying drawings,—

Figure 2:
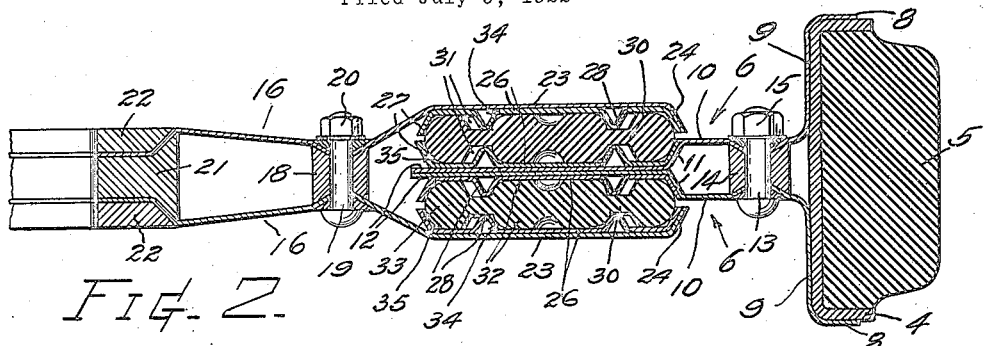
Figure 1:
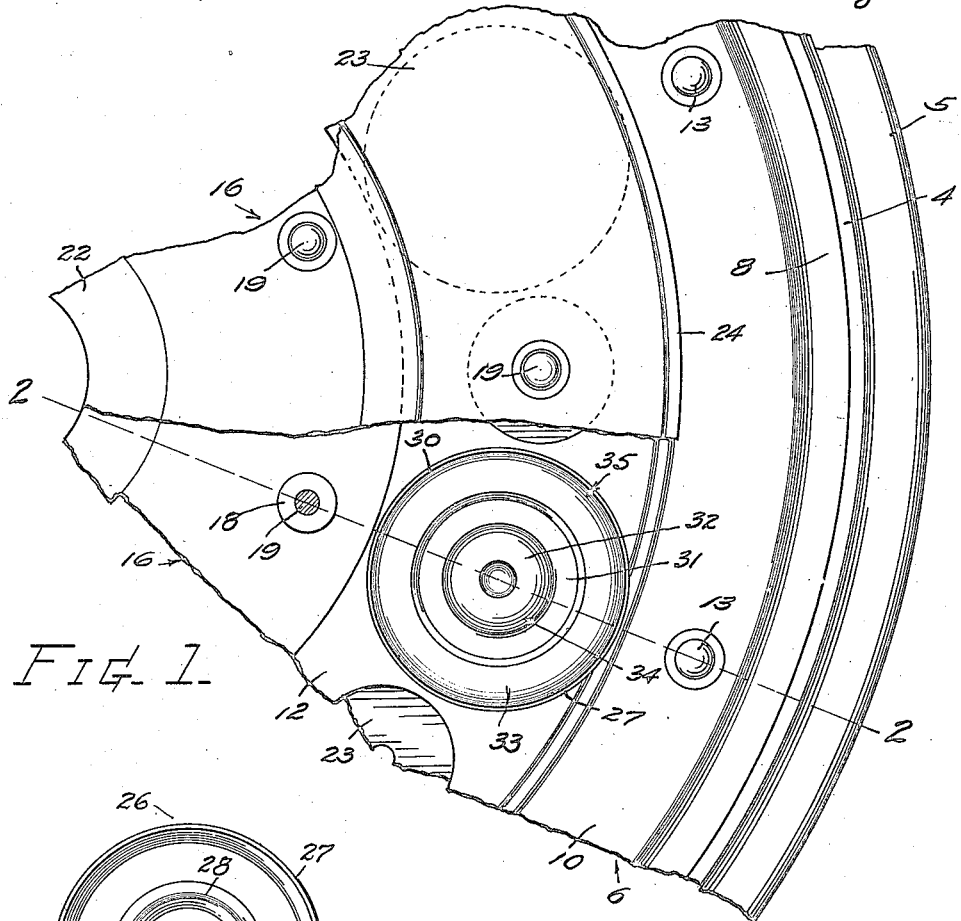
Figure 3:
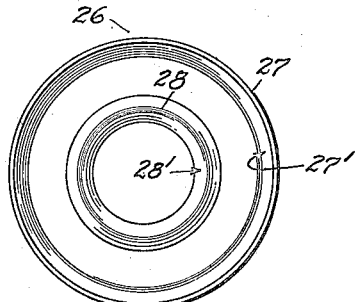

Figure 1 is a fragmentary side elevation of a resilient wheel embodying my invention. Fig. 2 is a sectional view taken substantially on broken line 2—2 of Fig. 1. Fig. 3 is an end elevation of one of resilient-block holding elements.

As shown in said drawings, my improved wheel comprises a circular rim element 4 having a channel therein to receive a wheel tread 5 of rubber or other suitable material.

The rim 4 is rigidly secured to an annular member composed of two pressed steel plates 6 by being clamped between the flanges 8 which extend from peripheral shoulders 9 upon which said rim is mounted. From the adjacent edges of the shoulders 9, the plates 6 extend inwardly in two spaced portions 10 to converging portions 11 and thence as juxtaposed plane portions 12. 13 represent headed bolts extending through the spaced portions of said annular member and tubular distance pieces 14 and cooperate with nuts 15 taking on the bolts for separably coupling the plates 6.

The inner plane portion of said annular member extends between the outer portions of two plates 16 of a disk member. The plates 16 are held in spaced relations with respect to each other by tubular distance pieces 18 through which extend headed bolts 19 to engage nuts 20 provided therefor.

The plates 16 of the disk member are furthermore engaged between spacing collars 21 and 22 which are secured upon a hub, not shown. Adjacent their outer periphery the plates 16 are offset to afford a plane portion 23 interiorly of a wall element 24 which extends circumferentially about the member. Rigidly secured as by welding or otherwise to the opposing surfaces of the plane portions 12 and 23 of said annular and disk members, respectively, are complementary cup elements 26 formed of pressed or cast metal, one of said cups being shown by itself in Fig. 3.

A cup is formed or provided with a peripheral flange 27 and a circular ridge 28 arranged concentrically. The inner surfaces $27^1$ and $28^1$, see Fig. 3, of the flange and ridge flare outwardly from the respective base portion of a cup to afford bearings of truncated conical shapes.

Interposed between the complementary cups 26 and extending into the cavities thereof are bodies 30 of rubber or a composition of rubber with other elastic material which will afford the desired resiliency to the wheel. Each of said bodies is formed to be of a substantially disk shape having each of its opposite sides corrugated by the provision of a recess 31 extending concentrically about the axis of the body and between a central circular projection 32 and a peripheral rib 33.

The projections 32 are of substantially truncated conoidal shapes, the peripheral surfaces being preferably curved as at 34. The outer or circumferential surface of a body 30 is also preferably curved as at 35.

The recesses 31 of the bodies 30 are of greater widths than the ridges 28 of the associated cups 26.

The diameters of the bodies 30 and the conoidal projections 32 thereof respectively, are approximately equal to the internal diameters of the flange 27 and ridge 28 of the cups 26 whereby the body surfaces 35 and 34, respectively, bear against the inner surfaces of the flanges and ribs of the associated cups.

By such a construction a relatively large amount of bearing surface is provided upon the bodies 30 with respect to the cups and the widths of the body recesses 31 with respect to the cup ridges 28 accommodate the distortion of the bodies when the same are supporting a load.

The number and sizes of the cups and elastic bodies in a wheel should be dependent upon the size, design and duty of the wheel.

I do not wish to confine myself to the exact construction and arrangement of the invention as illustrated and described except as limited by the following claim.

What I claim, is,—

In a resilient wheel, the combination with a central member provided with spaced plate elements, and an outer annular member having plate elements extending into the space between the plate elements of said central member, of a plurality of substantially disk shaped elastic bodies having corrugated opposite surfaces, and cup elements disposed in opposed relations upon the plate elements of both of said members to receive the respective elastic bodies, said cup elements being provided with peripheral flanges and circular ridges to afford concentric bearings with respect to the corrugated surfaces of the elastic bodies associated therewith.

Signed at Seattle, Washington, this 28th day of June, 1922.

HARRY M. PATCH.

Witnesses:
PIERRE BARNES,
MARGARET G. SUPPLE.